Dec. 17, 1929. V. C. HUFF 1,740,094
NUT LOCK
Filed June 17, 1927
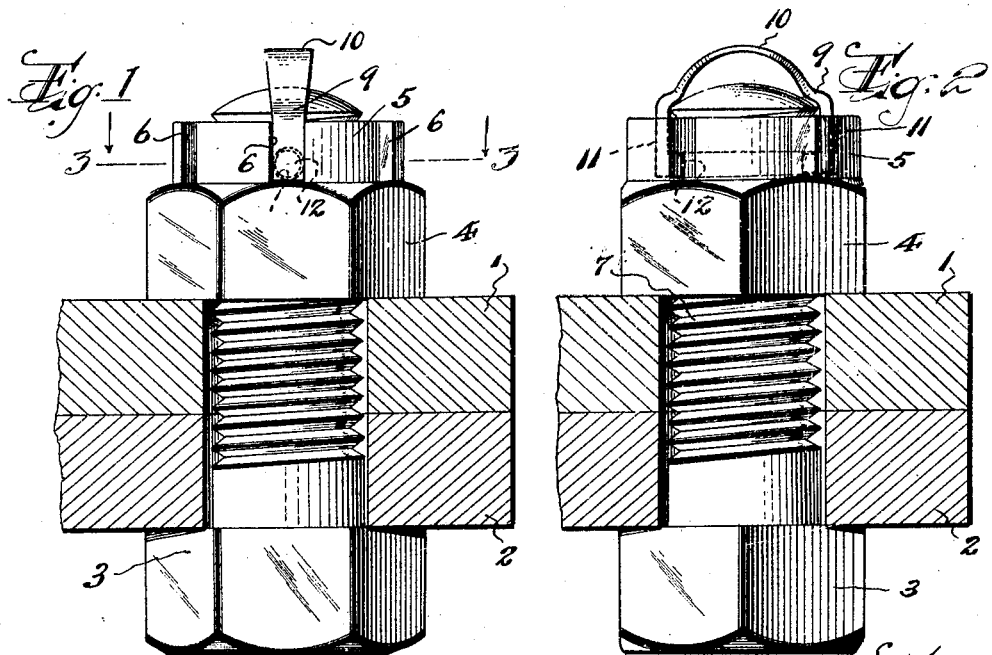
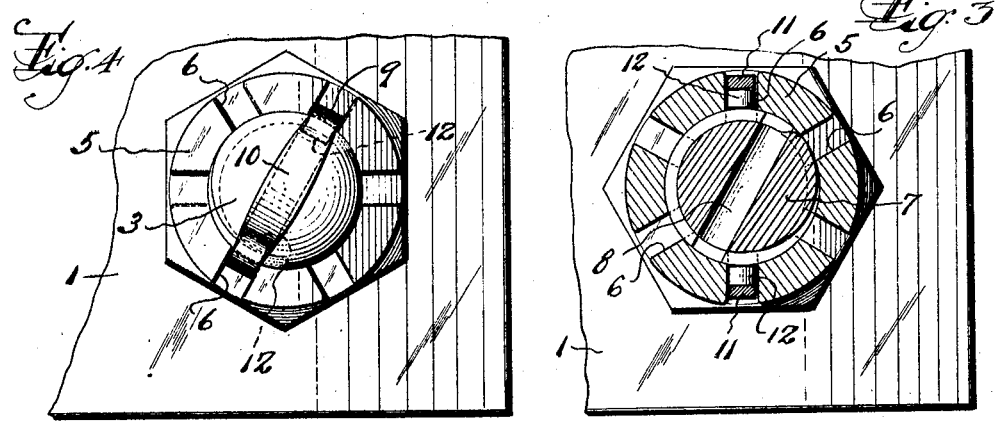
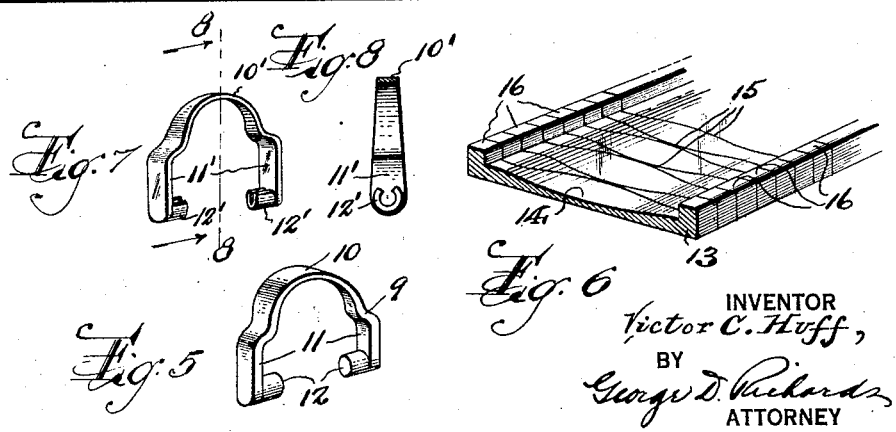
INVENTOR
Victor C. Huff,
BY
George D. Richards
ATTORNEY Patented Dec. 17, 1929

1,740,094

UNITED STATES PATENT OFFICE

VICTOR C. HUFF, OF EAST ORANGE, NEW JERSEY

NUT LOCK

Application filed June 17, 1927. Serial No. 199,461.

The present invention relates to nut locks.

An object of the invention is to provide a nut lock especially adapted for use with castellated nuts, which is simple and inexpensive to make and use, which is positive in its locking relation and which is adapted to be easily and quickly removed.

The nut lock of the invention lies smoothly over the bolt and has, when in operative relation to a castellated nut and bolt, no sharp externally projecting parts, and in this respect will serve advantageously as a substitute for cotter pins which extend from either side of the bolt and present sharp ends which can catch and cut the hands when fixing or adjusting machinery in which they are used. The nut lock of this invention also is more easily applied in places hard to reach than are cotter pins as will be apparent from the description of the structure and use.

Other objects and advantages of the invention will be apparent from the drawing and from the following description of an embodiment of the invention.

In the accompanying drawing there is shown for purposes of illustration a form of nut lock embodying the invention and an alternate form thereof, in which: Figure 1 is an elevation view in part section showing parts assembled between a castellated nut and bolt and a nut lock of the invention cooperating with the nut and bolt; Figure 2 is a similar view taken at right angles to that of Figure 1; Figure 3 is a sectional view taken along the line 3—3 of Figure 1 looking in the direction of the arrows; Figure 4 is a plan view of the assembly of Figure 1; Figure 5 is a perspective view of the nut lock of Figure 1; Figure 6 is a perspective view of a metal blank machined and laid out for the formation of nut locks of the form of Figure 5; Figure 7 is a perspective view of an alternate form of nut lock; and Figure 8 is a sectional view in elevation taken along the line 8—8 of Figure 7 and looking in the direction of the arrows.

In the drawing two pieces of metal 1 and 2 are clamped or held between the bolt 3 and the nut 4 thereon. Said nut 4 is of the ordinary castellated form, that is, it has on its outer end an extending skirt 5 which has formed therethrough at diametrically opposite points the slots 6, 6 which extend inwardly from the outer edge of the skirt. Extending entirely through the bolt 3 along a diameter thereof and near the outer end of the threaded portion 7 is the hole 8. In an alternate form there can be provided diametrically opposed holes which do not extend entirely through the bolt.

The nut lock comprises a main body 9 which is curved to fit over the end of the bolt 3. From the ends of the body 9 there extends in a direction away from the curve 10 a pair of end members 11, 11. On their inner sides said members 11, 11 carry the lugs 12, 12 which extend toward each other and are of a size to fit easily into said hole 8. The curved portion 10 is of spring or spring like material and tends to retract the members 12, 12 toward each other when released after they have been pressed apart.

The form illustrated in Figure 5 can be made by machinery from a flat bar of steel 13 to provide a longitudinal channel 14 of a width equal to the developed distance between the lugs 12, 12 in Figure 5. Said channel 14 is formed deeper at its center than at its sides to provide that the portion 10 is thinner than the remainder of the body 9. The channeled bar 13 is then cut transversely along the lines 15, 15 which are curved outwardly at the center to provide that the thin portion 10 is wider than the adjacent portions of shank 9. Said portion 10 is made thinner and wider than the portions adjacent thereto so that it will have more flexibility or springiness than the adjacent parts, which latter parts are required to have a degree of rigidity whereby the lugs 12, 12 will be held firmly in place in nut locking position. After the lock blanks have been cut from the channeled bar the rectangular lugs 16 may be rounded off to the form of lugs 12, 12 as shown, and the blank is bent to shape. The material of the nut lock can be of steel which will have a sufficient flexibility and springiness at the portion 10 in the finished lock, or it can be made of spring or of tool steel which can be properly tempered after being formed, or it can be made of other kinds of metal if desired.

The form shown in Figures 7 and 8 can be made from spring steel using longitudinal strips which are preferably narrowed transversely at the spring portion 10', of the main body thereof. The lugs 12', 12' are struck at right angles to the parts 11', 11' and are formed around a mandrel into a curved formation as shown particularly in Figure 8, so that they will fit readily into the locking hole 8 of a bolt to which they are applied. The lock is then bent to a form approximating that in which it will function as a lock and is then properly tempered in that form.

The nut lock described is used by springing it open and slipping it over the end of the bolt 3 with the lugs 12, 12 extending into diametrically opposite slots 6, 6 of the castellated portion of the nut 4 and onto the threads 7 of the bolt 3 a point just in advance of the said hole 8, in the direction of rotation of the nut as it is being turned on. The lock is applied at a point just before the final position of the nut on the bolt is attained, and when the nut is moved to the final position the slots 6 in which the lugs 12, 12 are entered will register with the ends of hole 8 and the spring portion 10 of the lock will then spring the members 11, 11 into the slots 6, 6 and the lugs 12, 12 into the ends of said hole 8, thereby positively locking the nut in position against movement in either direction. The lock is removed by a sharp blow from a hammer to break it at the bend 10, or any other part, to permit the removal of lugs 12, 12 from the locking hole 8.

Although there is shown and described and is pointed out in the annexed claims certain novel features of the invention, it will be understood that various omissions, substitutions and changes in the form and details of the lock nut illustrated may be made without departing from the spirit of the invention.

What I claim and desire to protect by Letters Patent is:—

1. A nut lock for use with a castellated nut and a bolt having diametrically opposite locking depressions, comprising a curved main body to bridge over the bolt end, end members projecting angularly from the terminal portions of said main body and in a direction away from the interior face of the latter so as to engage in the lateral openings of the castellated nut, and a pair of locking lugs respectively projecting laterally inward from said end members so as to enter the locking depressions of the bolt, the central portion of said main body being of reduced thickness as compared with its terminal portions whereby it is adapted to be easily broken by a hammer blow to release the nut and bolt from the restraint thereof.

2. A nut lock for use with a castellated nut and a bolt having diametrically opposite locking depressions, comprising a resilient main body adapted to bridge over the bolt end, angularly projecting end members integral with the terminal portions of said main body and extending in a direction away from the interior face thereof so as to enter the lateral openings of the castellated nut, and a pair of locking lugs respectively projecting laterally inward from said end members so as to enter the locking depressions of the bolt, said main body having a central portion of reduced cross section whereby the same may be easily broken by a sharp blow to facilitate the removal of the nut lock from operative relation to the nut and bolt.

3. A nut lock for use with a castellated nut and a bolt having diametrically opposite locking depressions, said nut lock consisting in an integral metallic structure comprising a resilient main body portion, rigid end members extending from the terminations of said body portion, and laterally and inwardly projecting locking lugs at the terminals of said end members, said resilient main body having a central portion of reduced cross section.

In testimony, that I claim the invention set forth above I have hereunto set my hand this 1st day of June, 1927.

VICTOR C. HUFF.